(12) United States Patent
Yoshida

(10) Patent No.: US 8,887,288 B2
(45) Date of Patent: Nov. 11, 2014

(54) METHOD OF DETECTING SOFTWARE FALSIFICATION, APPARATUS CONFIGURED TO DETECT SOFTWARE FALSIFICATION, AND COMPUTER-READABLE STORAGE MEDIUM

(75) Inventor: Fumiyuki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1207 days.

(21) Appl. No.: 12/370,650

(22) Filed: Feb. 13, 2009

(65) Prior Publication Data

US 2009/0210723 A1    Aug. 20, 2009

(30) Foreign Application Priority Data

Feb. 18, 2008   (JP) ................. 2008-036267

(51) Int. Cl.
  G06F 7/04      (2006.01)
  G06F 21/57     (2013.01)
  G06F 21/34     (2013.01)

(52) U.S. Cl.
  CPC ............... G06F 21/57 (2013.01); G06F 21/34 (2013.01)
  USPC ......................................................... 726/26

(58) Field of Classification Search
  CPC ........................................................ G06F 21/34
  USPC .............................................. 713/189; 726/26
  See application file for complete search history.

(56) References Cited

U.S. PATENT DOCUMENTS

| | | | | |
|---|---|---|---|---|
| 5,944,821 A * | 8/1999 | Angelo | ........................... | 726/22 |
| 6,178,509 B1 * | 1/2001 | Nardone et al. | ................. | 726/22 |
| 6,694,434 B1 * | 2/2004 | McGee et al. | ................ | 713/189 |
| 7,069,246 B2 * | 6/2006 | Stebbings | ........................ | 705/57 |
| 7,334,265 B1 * | 2/2008 | Morishita | ........................ | 726/26 |
| 2002/0054326 A1 | 5/2002 | Morita | | |
| 2003/0084299 A1 * | 5/2003 | Tamura et al. | ................ | 713/181 |
| 2005/0151987 A1 | 7/2005 | Kawaura et al. | | |
| 2005/0177737 A1 * | 8/2005 | Takeda et al. | ................. | 713/189 |
| 2006/0230419 A1 | 10/2006 | Yoshida | | |
| 2007/0136816 A1 * | 6/2007 | Cuenod et al. | .................. | 726/26 |
| 2007/0150966 A1 * | 6/2007 | Kirschner et al. | .............. | 726/30 |
| 2007/0250627 A1 * | 10/2007 | May et al. | ...................... | 709/225 |
| 2008/0280592 A1 * | 11/2008 | McCown et al. | ............. | 455/411 |
| 2009/0210723 A1 | 8/2009 | Yoshida | | |

FOREIGN PATENT DOCUMENTS

| | | |
|---|---|---|
| JP | 2004-213057 | 7/2004 |
| JP | 2004-280284 | 10/2004 |
| JP | 2005-084989 | 3/2005 |
| JP | 2007-041694 | 2/2007 |
| JP | 2009-193528 | 8/2009 |

OTHER PUBLICATIONS

Japanese Office Action dated Jun. 25, 2013.

* cited by examiner

Primary Examiner — Tamara T Kyle
(74) Attorney, Agent, or Firm — IPUSA, PLLC

(57) ABSTRACT

A method of detecting falsification of software installed in an apparatus includes the steps of (a) encrypting software configuration information of the apparatus at the time of installing the software using an encryption and decryption unit specific to the apparatus, and storing the encrypted software configuration information outside the apparatus, (b) decrypting the encrypted software configuration information of the apparatus at the time of installing the software, stored outside the apparatus, using the encryption and decryption unit specific to the apparatus, and (c) determining the presence or absence of the falsification of the software by comparing the software configuration information of the apparatus at the time of installing the software obtained by step (b) and the current software configuration information of the apparatus.

20 Claims, 20 Drawing Sheets

FIG.3
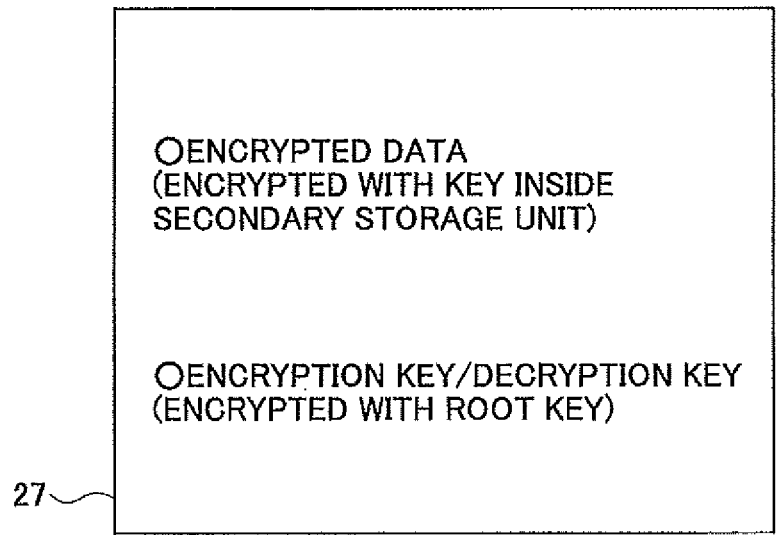
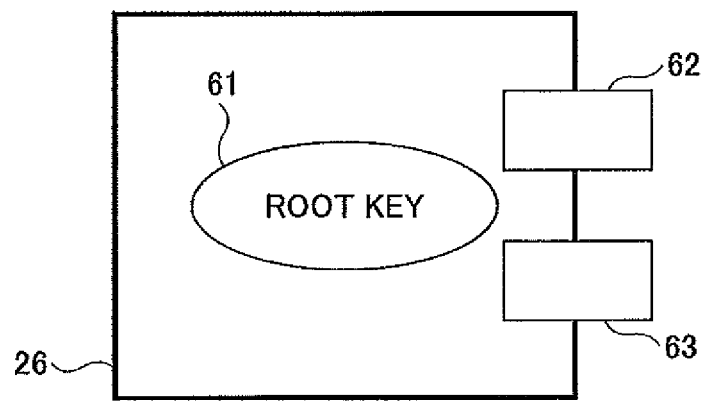

METHOD OF DETECTING SOFTWARE FALSIFICATION, APPARATUS CONFIGURED TO DETECT SOFTWARE FALSIFICATION, AND COMPUTER-READABLE STORAGE MEDIUM

BACKGROUND OF THE INVENTION

1. Field of the Invention

The present invention relates generally to methods of detecting software falsification, apparatuses configured to detect software falsification, and computer-readable storage media, and more particularly to a method of detecting falsification of software installed in an apparatus, an apparatus configured to detect falsification of installed software, and a computer-readable storage medium storing a program for causing a computer to execute such a method.

2. Description of the Related Art

As methods of detecting falsification (alteration) of firmware (software) installed in an apparatus, for example, those using a hash value are conventionally known. (See, for example, Japanese Laid-Open Patent Applications No. 2004-213057, No. 2005-084989, and No. 2007-041694.)

According to the conventional falsification detecting method using a hash value, the hash value of firmware to be installed in an apparatus is calculated and prestored in a secondary storage unit of the apparatus at the time of its installation. Then, at the time of starting the apparatus, the hash value of the firmware is recalculated and compared with the hash value prestored in the secondary storage unit. If these hash values do not match, it is determined that the firmware has been falsified, and an abnormal-time operation is performed.

The conventional falsification detecting method using a hash value can detect falsification of the firmware, but has a problem in that it is prevented from detecting falsification of the firmware if the hash value prestored in the secondary storage unit of the apparatus is also falsified along with the firmware.

Further, the conventional falsification detecting method using a hash value has a problem in that it is prevented from detecting deletion of the firmware if the hash value prestored in the secondary storage unit of the apparatus is also deleted along with the firmware. This problem is due to the fact that the hash value cannot detect a change in the firmware configuration of the entire apparatus although it can detect falsification of individual firmware.

With respect to the problem that falsification of the firmware cannot be detected if the hash value prestored in the secondary storage unit of the apparatus is falsified along with the firmware, falsification of the hash value may be prevented by providing an encryption/decryption key in the apparatus and encrypting the hash value to be prestored in the secondary storage unit of the apparatus.

However, since the encryption/decryption key is stored in the secondary storage unit of the apparatus, the falsification detecting method that encrypts a hash value to be stored in the secondary storage unit of the apparatus has a problem in that a malicious third party can illegally obtain the decryption key from the secondary storage unit of the apparatus and decrypt the encrypted hash value.

Thus, the conventional falsification detecting method using a hash value is ineffective with respect to falsification of a hash value stored in the apparatus. Further, the conventional falsification detecting method using a hash value is ineffective with respect to falsification of the firmware configuration of the entire apparatus. Further, the conventional falsification detecting method using a hash value cannot detect the falsification of a hash value or the falsification of the firmware configuration of the entire apparatus completely even with encryption for preventing falsification.

SUMMARY OF THE INVENTION

Embodiments of the present invention may solve or reduce one or more of the above-described problems.

According to one aspect of the present invention, a method of detecting software falsification and an apparatus configured to detect software falsification are provided in which one or more of the above-described problems may be solved or reduced, and a computer-readable storage medium is provided that stores a program for causing a computer to execute such a method.

According to one aspect of the present invention, a method of detecting software falsification and an apparatus configured to detect software falsification are provided that can easily detect falsification of installed software and falsification of software configuration, and a computer-readable storage medium is provided that stores a program for causing a computer to execute such a method.

According to one embodiment of the present invention, a method of detecting a falsification of software installed in an apparatus is provided that includes the steps of (a) encrypting software configuration information of the apparatus at a time of installing the software using an encryption and decryption unit specific to the apparatus, and storing the encrypted software configuration information outside the apparatus, (b) decrypting the encrypted software configuration information of the apparatus at the time of installing the software, stored outside the apparatus, using the encryption and decryption unit specific to the apparatus, and (c) determining a presence or absence of the falsification of the software by comparing the software configuration information of the apparatus at the time of installing the software obtained by step (b) and current software configuration information of the apparatus.

According to one embodiment of the present invention, a computer-readable storage medium is provided that stores a program for causing a computer to execute a method of detecting a falsification of software installed in an apparatus, the method including the steps of (a) encrypting software configuration information of the apparatus at a time of installing the software using an encryption and decryption unit specific to the apparatus, and storing the encrypted software configuration information outside the apparatus, (b) decrypting the encrypted software configuration information of the apparatus at the time of installing the software, stored outside the apparatus, using the encryption and decryption unit specific to the apparatus, and (c) determining a presence or absence of the falsification of the software by comparing the software configuration information of the apparatus at the time of installing the software obtained by step (b) and current software configuration information of the apparatus.

According to one embodiment of the present invention, an apparatus configured to detect a falsification of software installed therein is provided that includes an encryption and decryption unit specific to the apparatus, an installation part configured to install the software, and a falsification detection part configured to detect the falsification of the software, wherein the installation part is configured to encrypt software configuration information of the apparatus at a time of installing the software using the encryption and decryption unit specific to the apparatus, and to store the encrypted software configuration information outside the apparatus, and the falsification detection part is configured to decrypt the encrypted software configuration information of the apparatus at the time of installing the software, stored outside the apparatus, using the encryption and decryption unit specific to the apparatus, and to determine a presence or absence of the falsification of the software by comparing the software configuration information of the apparatus at the time of installing the software and current software configuration information of the apparatus.

BRIEF DESCRIPTION OF THE DRAWINGS

Other objects, features and advantages of the present invention will become more apparent from the following detailed description when read in conjunction with the accompanying drawings, in which:

FIG. 3 is a schematic diagram for illustrating an encrypted data storing method in the multifunction machine including the apparatus-specific encryption and decryption unit according to the embodiment of the present invention;

DETAILED DESCRIPTION OF THE PREFERRED EMBODIMENTS

A description is given below, with reference to accompanying drawings, of an embodiment of the present invention. In this embodiment, a description is given taking a multifunction machine as an example of the apparatus that detects falsification of installed software. However, the apparatus may be any apparatus such as one having software (firmware) incorporated (installed) therein.

Figure 1:
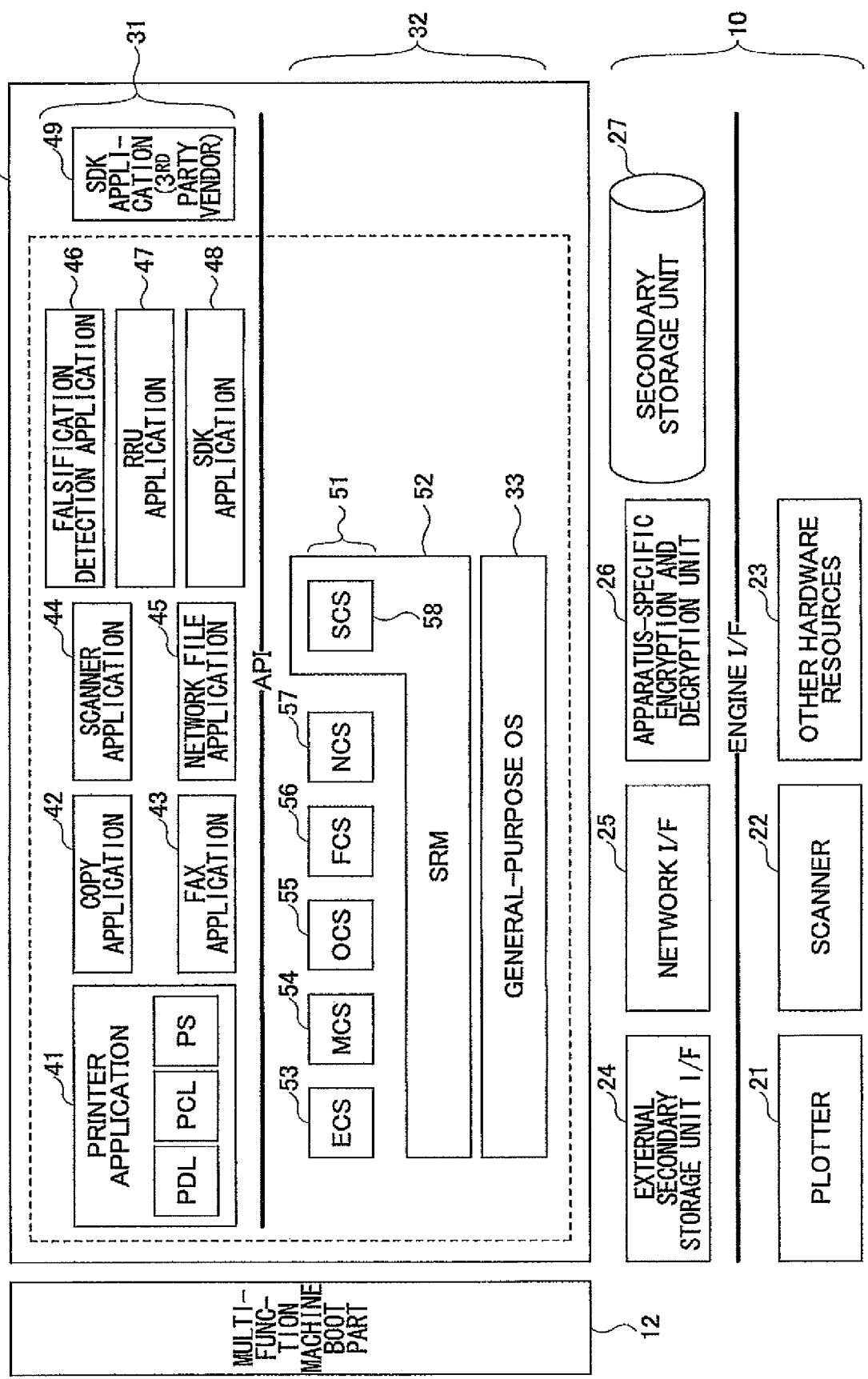
FIG. 1 is a block diagram showing a multifunction machine according to an embodiment of the present invention.

FIG. 1 is a block diagram showing a multifunction machine 1 according to this embodiment. The multifunction machine 1 includes various hardware items 10 (hereinafter, collectively referred to as "hardware 10"), various software items 11 (hereinafter, collectively referred to as "software 10"), and a multifunction machine boot part 12.

The hardware 10 includes a plotter 21, a scanner 22, other hardware resources 23, an external secondary storage unit interface (I/F) 24, a network I/F 25, an encryption and decryption unit 26 specific to the multifunction machine 1 (hereinafter referred to as "apparatus-specific encryption and decryption unit 26"), and a secondary storage unit 27 of the multifunction machine 1.

The external secondary storage unit I/F 24 is an I/F to which a certain secondary storage unit is connected externally, such as an SD card slot for externally connecting an SD card. The network I/F 25 connects to a secondary storage unit such as an external server via a network such as the Internet or a local area network (LAN). The apparatus-specific encryption and decryption unit 26 is implemented by, for example, a trusted platform module (TPM), which is a security chip. The apparatus-specific encryption and decryption unit 26 is described in detail below.

The software 11 includes various applications 31, a platform 32, and a general-purpose OS (operating system) 33 such as UNIX (registered trademark). Programs constituting the applications 31 and the platform 32 are executed in parallel on a process basis by the general-purpose OS 33.

The applications 31 include a printer application 41 in page description language (PDL), printer control language (PCL), and postscript (PS), a copy application 42, a facsimile (FAX) application 43, a scanner application 44, a network file application 45, a falsification detection application 46, a remote ROM updating (RRU) application 47, a software development kit (SDK) application 48, and an SDK application 49 by a third-party vendor. The SDK application 48 and the third-party-vendor SDK application 49 are programs developed using dedicated SDKs. The falsification detection application 46 is described in detail below.

The platform 32 includes various control services 51 and a system resource manager (SRM) 52. The control services 51 include an engine control service (ECS) 53, a memory control service (MCS) 54, an operations panel control service (OCS) 55, a facsimile control service (FCS) 56, a network control service (NCS) 57, and a system control service (SCS) 58. The details of the programs constituting the platform 32 are set forth in, for example, U.S. Pat. Pub. No. US 2002/0054326, the teachings of which are incorporated herein by reference, and accordingly, a description thereof is omitted.

The multifunction machine boot part 12 is executed first when the multifunction machine 1 is turned on. As a result, the general-purpose OS 33 is started and the applications 31 and the platform 32 are activated. The programs constituting the applications 31 and the platform 32, which are contained in the secondary storage unit 27 such as a hard disk drive (HDD) or a memory card, are read from the HDD or memory card to be activated in a memory.

Figure 2:
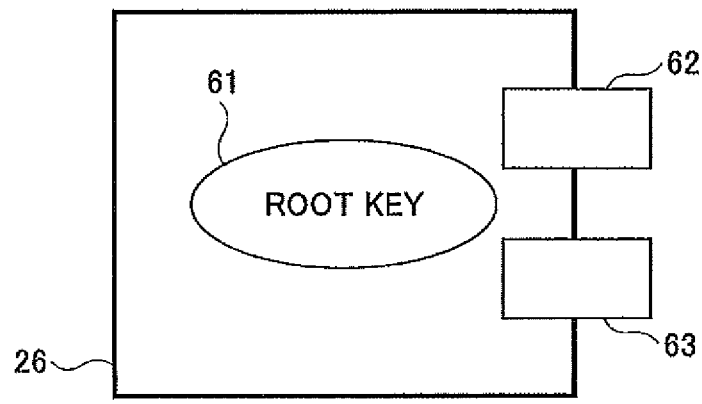
FIG. 2 is a schematic diagram for illustrating an apparatus-specific encryption and decryption unit according to the embodiment of the present invention.

FIG. 2 is a schematic diagram for illustrating the apparatus-specific encryption and decryption unit 26. The apparatus-specific encryption and decryption unit 26 includes a root key 61 and two I/Fs 62 and 63. The root key 61 is an encryption/decryption key that cannot be extracted from the apparatus-specific encryption and decryption unit 26. The apparatus-specific encryption and decryption unit 26 has an encryption and decryption function using the root key 61.

The I/F 62 encrypts plaintext data with the root key 61 and returns the encrypted plaintext data. The I/F 63 decrypts encrypted plaintext data with the root key 61, and returns the plaintext data. The apparatus-specific encryption and decryption unit 26 has its hardware directly fixed to the board, and is not usable even if removed and attached to another apparatus.

FIG. 3 is a schematic diagram for illustrating an encrypted data storing method in the multifunction machine 1 including the apparatus-specific encryption and decryption unit 26. The secondary storage unit 27 of the multifunction machine 1 contains an encryption/decryption key encrypted with the root key 61 and data encrypted with the encryption key. The encrypted data contained in the secondary storage unit 27 are decrypted according to the processing procedure shown in the sequence diagram of FIG. 4 and used.

Figure 4:
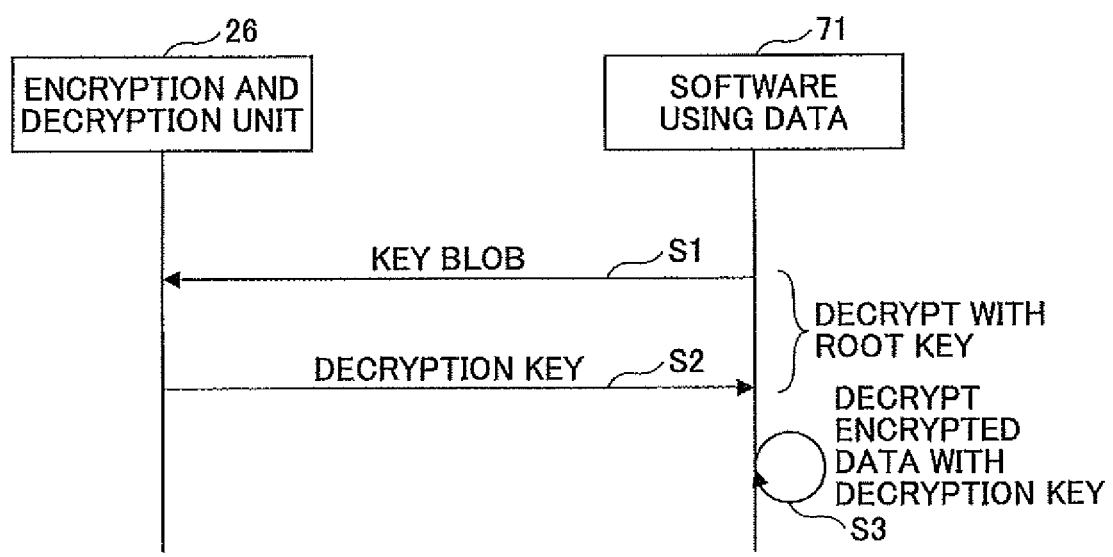
FIG. 4 is a sequence diagram for illustrating an encrypted data decrypting method in the multifunction machine including the apparatus-specific encryption and decryption unit according to the embodiment of the present invention.

FIG. 4 is a sequence diagram for illustrating an encrypted data decrypting method in the multifunction machine 1 including the apparatus-specific encryption and decryption unit 26. In the following description, encrypted data are referred to as a data name plus BLOB. For example, an encrypted encryption/decryption key is referred to as "key BLOB."

Referring to FIG. 4, in step S1, software 71 using data transmits a key BLOB to the apparatus-specific encryption and decryption unit 26, and causes the apparatus-specific encryption and decryption unit 26 to decrypt the key BLOB with the root key 61. In step S2, the apparatus-specific encryption and decryption unit 26 transmits a decryption key into which the key BLOB is decrypted to the software 71. In step S3, the software 71 decrypts encrypted data with the received decryption key.

According to the encrypted data storing method illustrated in FIG. 3, the key BLOB contained in the secondary storage unit 27 cannot be decrypted even if the whole secondary storage unit 27 is removed from the multifunction machine 1 to another apparatus. Accordingly, the encrypted data cannot be decrypted. Further, according to the encrypted data storing method illustrated in FIG. 3, the root key 61 cannot be extracted from the apparatus-specific encryption and decryption unit 26. Accordingly, there is no risk of the root key 61 being stolen.

According to the conventional encrypted data storing method without an apparatus-specific encryption and decryption unit, both the encryption/decryption key and the encrypted data are contained in the secondary storage unit of the apparatus. Accordingly, if the whole secondary storage unit of the apparatus is removed to another apparatus, the encrypted data can be decrypted with the decryption key contained in the secondary storage unit.

Figure 5:
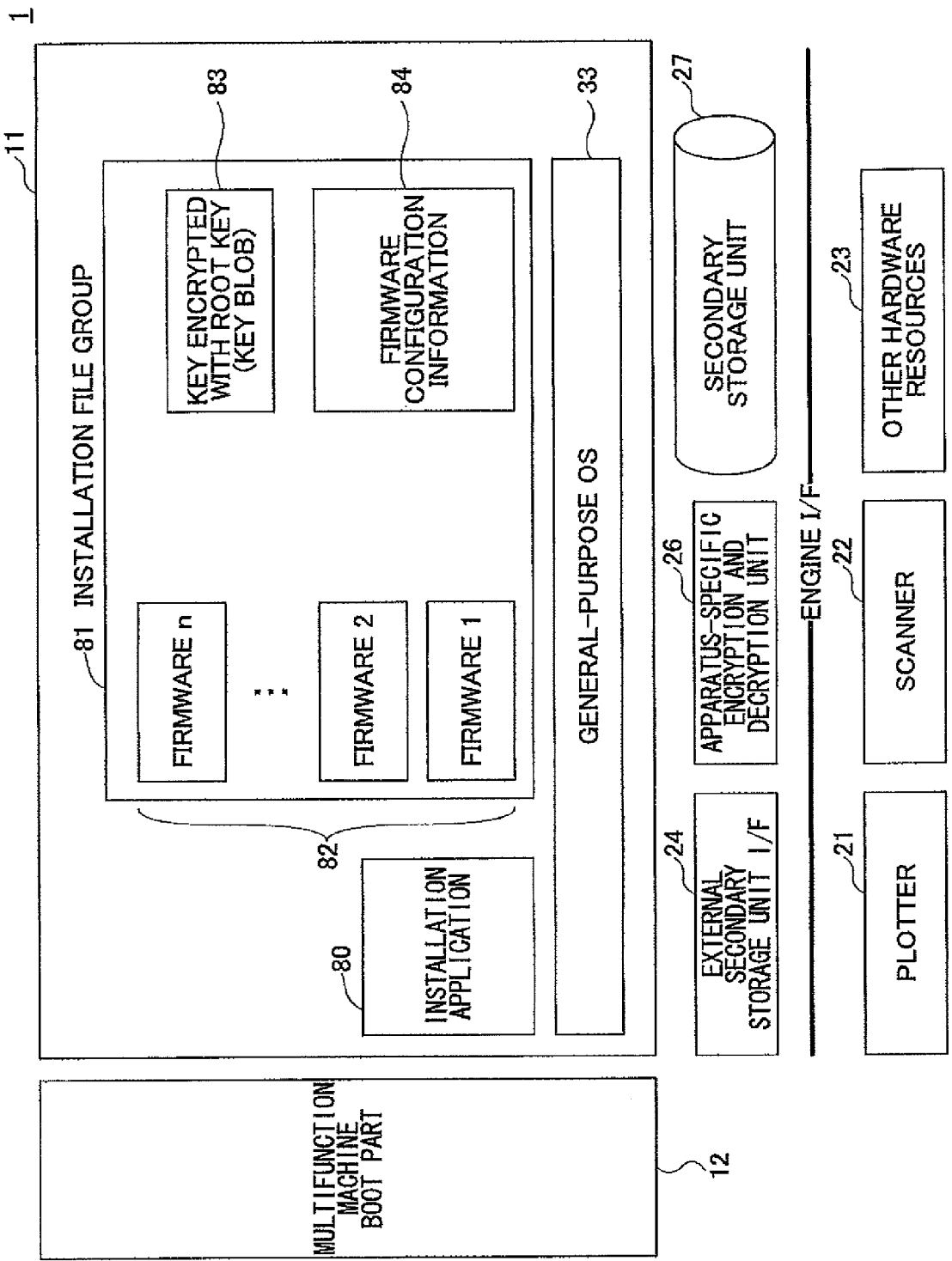
FIG. 5 is a block diagram for illustrating the writing of firmware into the multifunction machine according to the embodiment of the present invention.

FIG. 5 is a block diagram for illustrating the writing of firmware into the multifunction machine 1 of this embodiment. Parts unnecessary for description are properly omitted in the block diagram of FIG. 5.

The software 11 of the multifunction machine 1 includes an installation application 80, which is a tool for writing (installing) various firmware items 82 in the multifunction machine 1. The firmware items 82 may also be collectively referred to as "firmware 82" hereinafter. The firmware 82 is included in an installation file group (a group of files for installation) 81. The installation file group 81 further includes a key BLOB 83, which is an encryption/decryption key encrypted with the root key 61, and firmware configuration information 84. The firmware configuration information 84 may be either included in the installation file group 81 or generated.

The firmware configuration information 84 uniquely identifies the firmware 82 written in the multifunction machine 1. For example, the firmware configuration information 84 includes the file configuration list (the result of ls of UNIX [registered trademark]) of the secondary storage unit 27 and the version information of the firmware 82.

Figure 6:
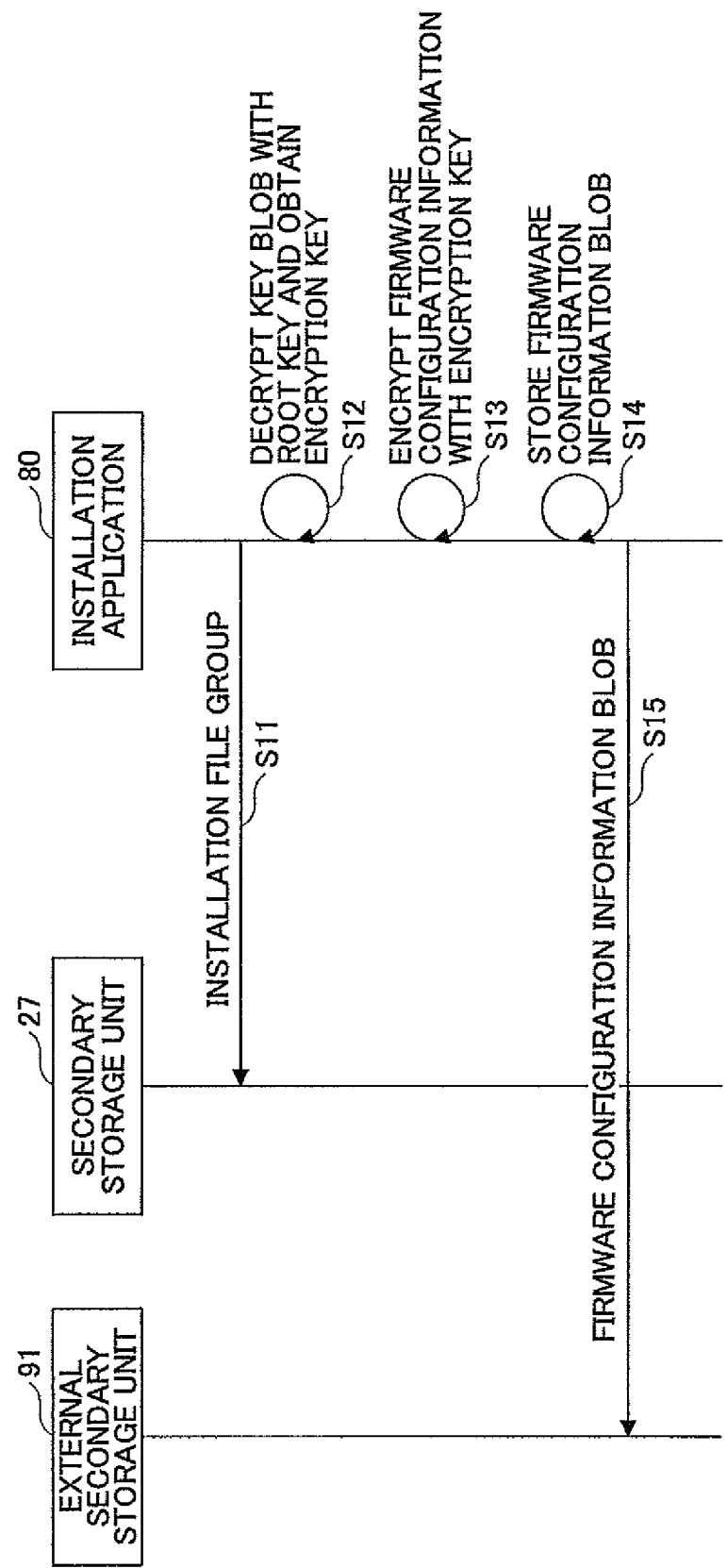
FIG. 6 is a sequence diagram for illustrating the writing of firmware into the multifunction machine according to the embodiment of the present invention.

FIG. 6 is a sequence diagram for illustrating the writing of firmware into the multifunction machine 1 of this embodiment. In step S11, the installation application 80 writes the installation file group 81 in the secondary storage unit 27. In step S12, the installation application 80 transmits the key BLOB 83 included in the installation file group 81 to the apparatus-specific encryption and decryption unit 26, and causes the apparatus-specific encryption and decryption unit 26 to decrypt the key BLOB 83 with the root key 61, thereby obtaining an encryption key.

In step S13, the installation application 80 encrypts the firmware configuration information 84 with the encryption key, thereby generating firmware configuration information BLOB. In steps S14 and S15, the installation application 80 stores the firmware configuration information BLOB in an external secondary storage unit 91 such as an SD card connected via the external secondary storage unit I/F 24 or an external server connected via the network I/F 25.

According to the multifunction machine 1 of this embodiment, it is possible to prevent falsification by a malicious third party by, for example, storing the firmware configuration information BLOB in the external secondary storage unit 91.

Figure 7:
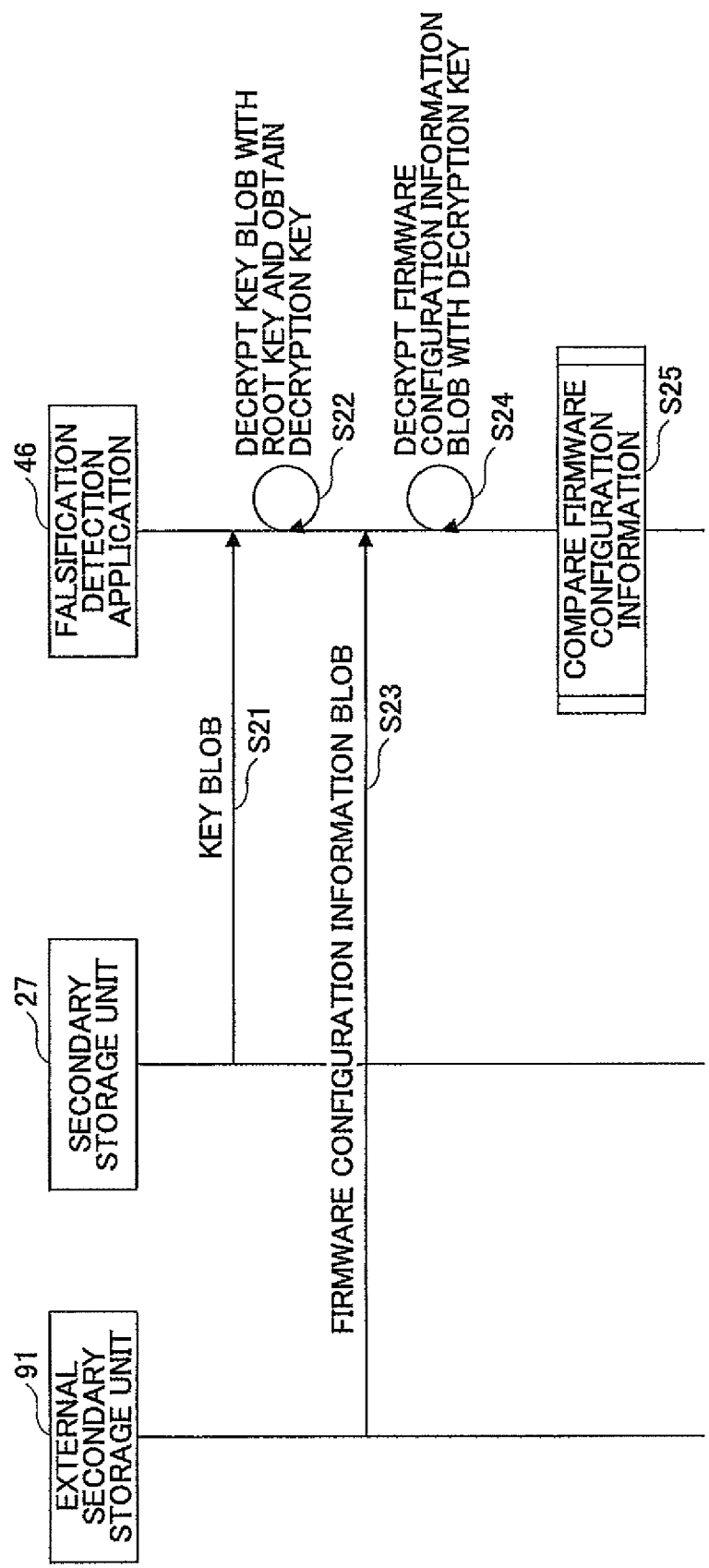
FIG. 7 is a sequence diagram for illustrating detection of falsification of firmware installed in the multifunction machine according to the embodiment of the present invention.

Next, FIG. 7 is a sequence diagram for illustrating detection of falsification of firmware installed in the multifunction machine 1 according to this embodiment. The configuration of the multifunction machine 1 at the time of executing firmware falsification detection is equivalent to that of FIG. 1.

Referring to FIG. 7, in step S21, the falsification detection application 46 extracts the key BLOB 83 from the secondary storage unit 27 of the multifunction machine 1. In step S22, the falsification detection application 46 transmits the key BLOB 83 to the apparatus-specific encryption and decryption unit 26, and causes the apparatus-specific encryption and decryption unit 26 to decrypt the key BLOB 83 with the root key 61, thereby obtaining a decryption key. In step S23, the falsification detection application 46 extracts the firmware configuration information BLOB from the external secondary storage unit 91. In step S24, the falsification detection application 46 decrypts the firmware configuration information BLOB with the decryption key, thereby obtaining the firmware configuration information 84.

Then, in step S25, the falsification detection application 46 compares the current firmware configuration information of the applications 31 installed in the multifunction machine 1 and the firmware configuration information 84 obtained by decrypting the firmware configuration information BLOB with the decryption key. The falsification detection application 46 detects falsification if the current firmware configuration information and the obtained firmware configuration information 84 do not match. The processing of step S25 is described in detail below.

[First Configuration]

According to a first configuration of this embodiment, the multifunction machine 1 executes detection of falsification of installed firmware every time the multifunction machine 1 is booted. Further, text files containing the version character strings of the corresponding firmware items 82 (Firmware 1, Firmware 2, . . . , Firmware n; n is an integer greater than zero) constitute firmware configuration information. Further, the external secondary storage unit is a portable secondary storage unit such as a USB memory or SD card.

Figure 8:
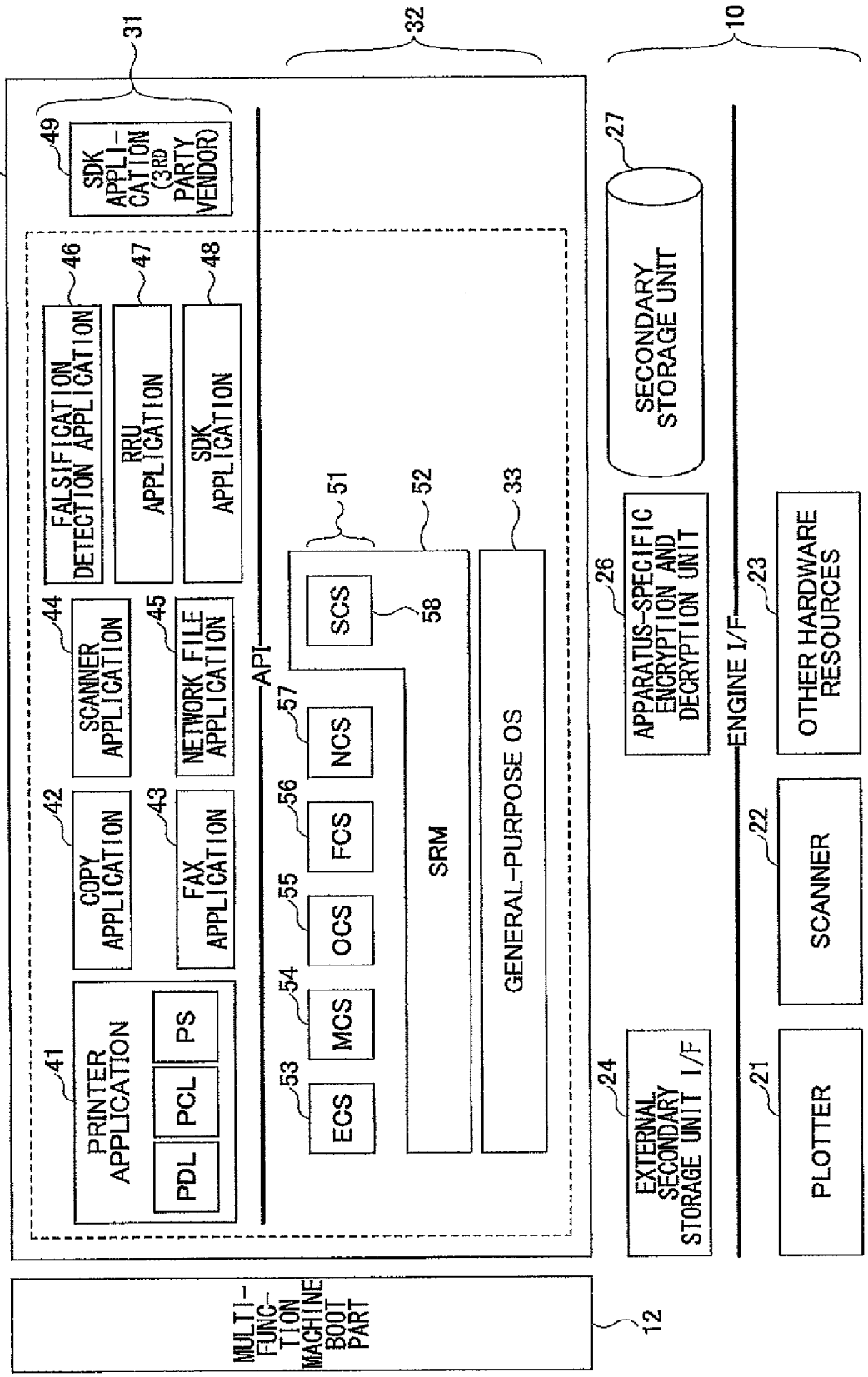
FIG. 8 is a block diagram showing the multifunction machine according to a first configuration of the embodiment of the present invention.

FIG. 8 is a block diagram showing the multifunction machine 1 according to the first configuration. The multifunction machine 1 of FIG. 8 does not have the network I/F 25, which is a difference from the configuration of FIG. 1.

Figure 9:
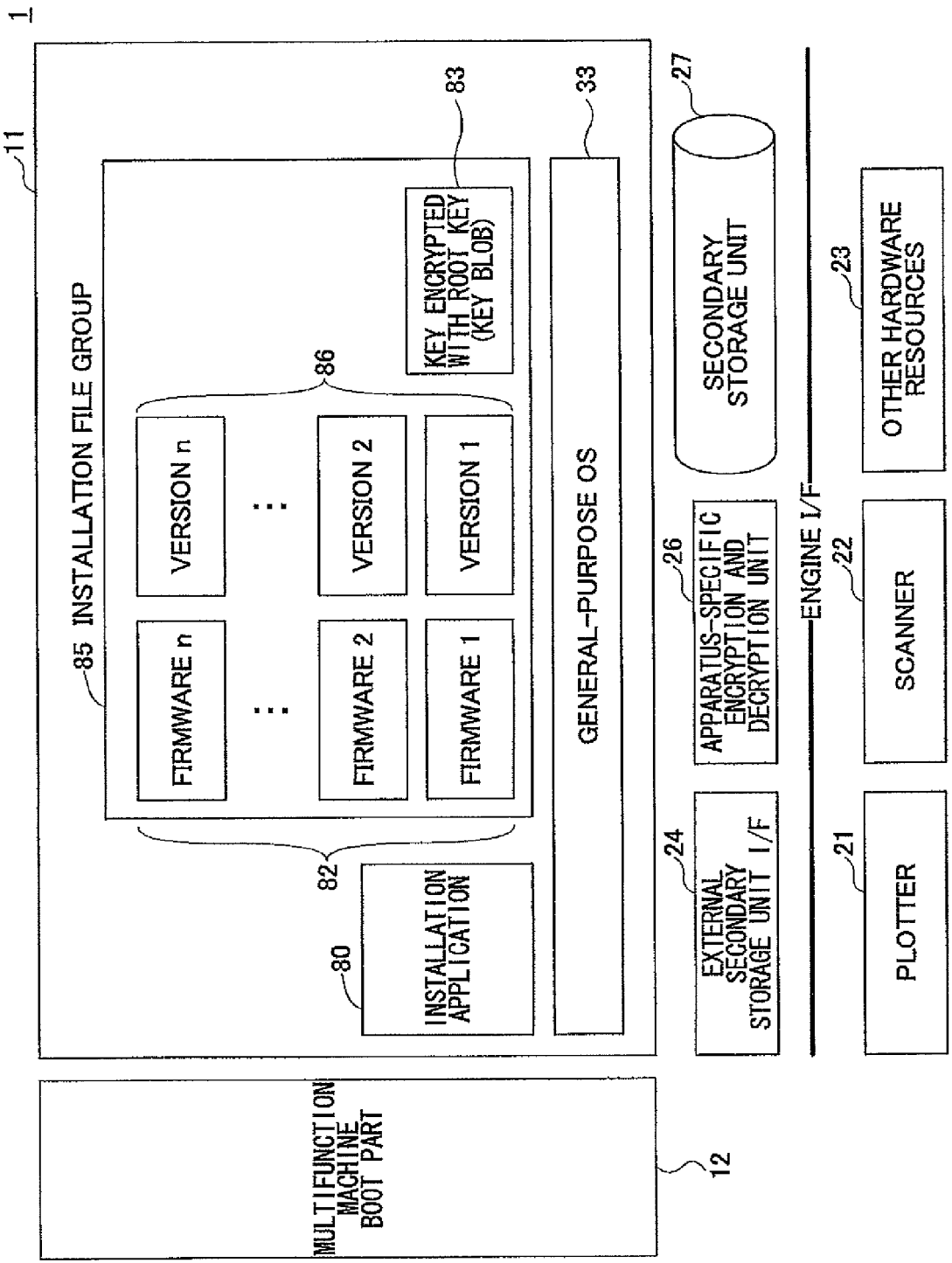
FIG. 9 is a block diagram for illustrating the writing of firmware into the multifunction machine according to the first configuration of the embodiment of the present invention.

FIG. 9 is a block diagram for illustrating the writing of firmware into the multifunction machine 1 of the first configuration. The block diagram of FIG. 9 is different from the block diagram of FIG. 5 in that the firmware configuration information 84 of FIG. 5 is replaced with version files 86 (Version 1 Version 2, . . . , Version n). The version files 86 are text files in which the version character strings of the corresponding firmware items 82 are written.

The version files 86 are manually or automatically generated in advance before installation of the firmware items 82 in the multifunction machine 1. The installation application 80 does not participate in generation of the version files 86. The version files 86 are an example of the firmware configuration information 84.

Figure 10:
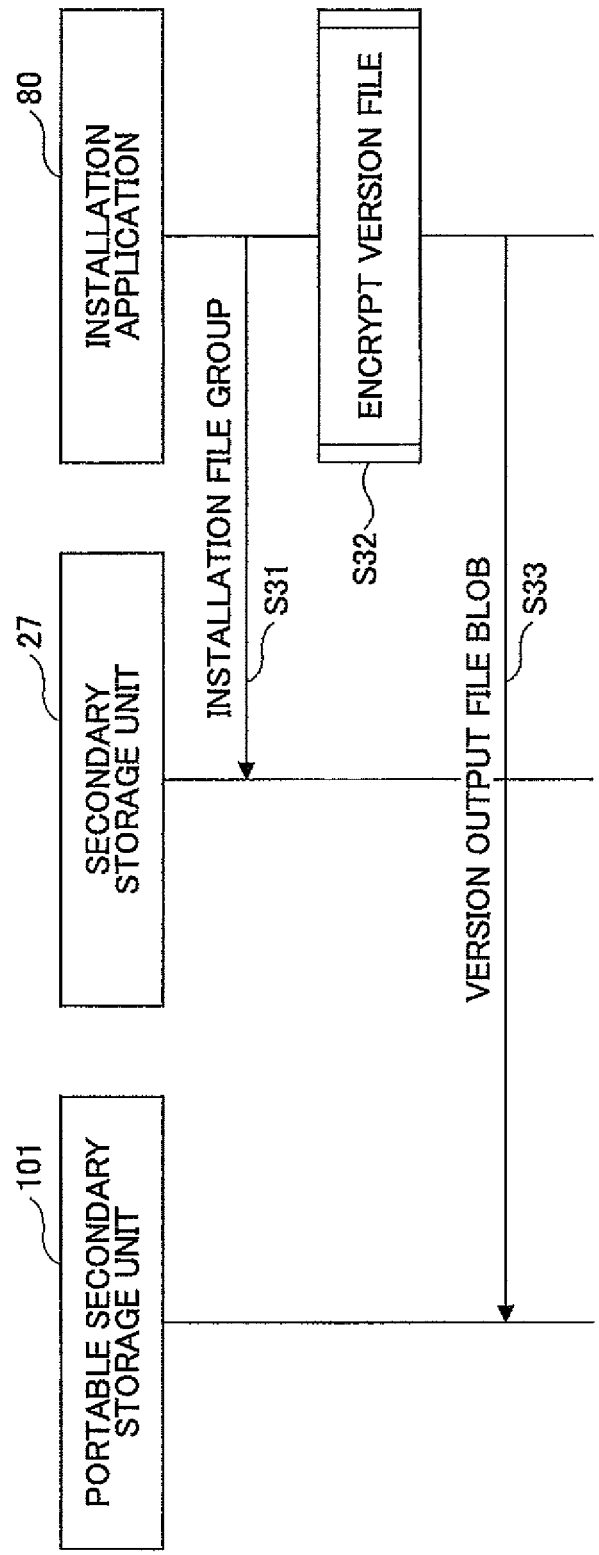
FIG. 10 is a sequence diagram for illustrating the writing of firmware into the multifunction machine according to the first configuration of the embodiment of the present invention.
Figure 11:
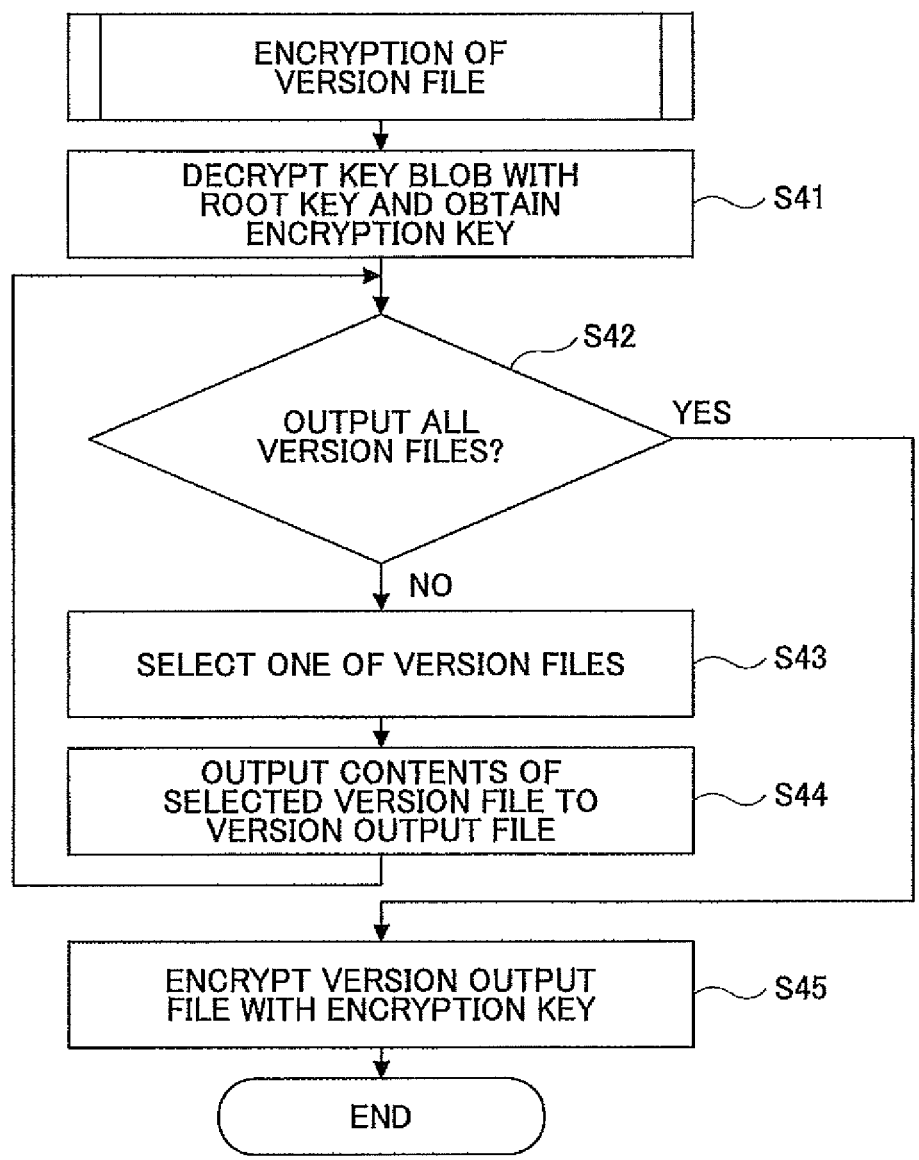
FIG. 11 is a flowchart showing a version file encryption process according to the first configuration of the embodiment of the present invention.

FIG. 10 is a sequence diagram for illustrating the writing of firmware into the multifunction machine 1 of the first configuration. In step S31, the installation application 80 writes an installation file group 85 in the secondary storage unit of the multifunction machine 1. In step S32, the installation application 80 encrypts the version files 86 as illustrated in FIG. 11. FIG. 11 is a flowchart showing a version file encryption process.

In step S41 of FIG. 11, the installation application 80 transmits the key BLOB 83 included in the installation file group 85 to the apparatus-specific encryption and decryption unit 26, and causes the apparatus-specific encryption and decryption unit 26 to decrypt the key BLOB 83 with the root key 61, thereby obtaining an encryption key. In step S42, the installation application 80 determines whether it has output all the version files 86.

If the installation application 80 determines that it has not output all the version files 86 (that is, there remains one or more version files 86 that have not been output) (NO in step S42), in step S43, the installation application 80 selects one of the version files 86 included in the installation file group 85.

In step S44, the installation application so outputs the contents of the selected one of the version files 86 to a version output file, and then returns to step S42. The installation application 80 repeats the process of steps S42 through S44 until the contents of all the version files 86 have been output to the version output file. If the installation application 80 determines that it has output all the version files 86 (that is, there remains no version file 86 that has not been output) (YES in step S42), in step S45, the installation application 80 encrypts the version output file with the encryption key, thereby generating a version output file BLOB.

Next, in step S33 of FIG. 10, the installation application 80 stores the version output file BLOB in a portable secondary storage unit 101 such as an SD card connected via the external secondary storage unit I/F 24. The portable secondary storage unit 101 is attached to the multifunction machine 1 at the time of detecting falsification of the applications (firmware) 31 installed in the multifunction machine 1.

According to the multifunction machine 1 of the first configuration, it is possible to prevent falsification by a malicious third party by storing the version output file BLOB in the portable secondary storage unit 101 outside the multifunction machine 1.

Figure 12:
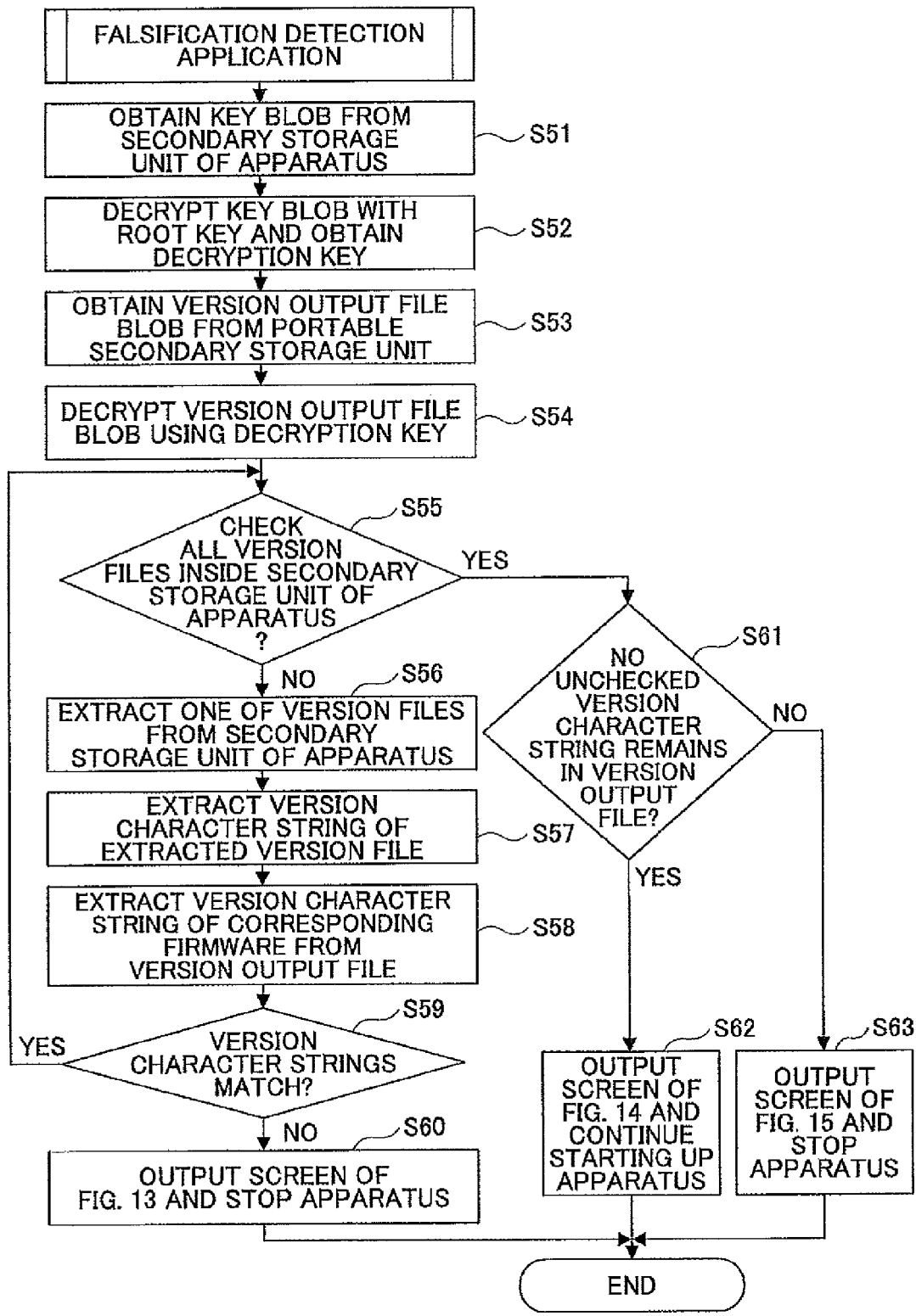
FIG. 12 is a flowchart for illustrating detection of firmware falsification in the multifunction machine according to the first configuration of the embodiment of the present invention.

FIG. 12 is a flowchart for illustrating detection of firmware falsification in the multifunction machine 1 of the first configuration. The configuration of the multifunction machine 1 at the time of executing firmware falsification detection is equivalent to that of FIG. 8.

Referring to FIG. 12, in step S51, the falsification detection application 46 extracts the key BLOB 83 from the secondary storage unit 27 of the multifunction machine 1. In step S52, the falsification detection application 46 transmits the key BLOB 83 to the apparatus-specific encryption and decryption unit 26, and causes the apparatus-specific encryption and decryption unit 26 to decrypt the key BLOB 83 with the root key 61, thereby obtaining a decryption key. In step S53, the falsification detection application 46 extracts the version output file BLOB from the portable secondary storage unit 101 connected via the external secondary storage unit I/F 24. In step S54, the falsification detection application 46 decrypts the version output file BLOB with the decryption key, thereby obtaining the version output file.

In step S55, the falsification detection application 46 determines whether it has checked all the current version files 86 of the firmware items 82 installed in the multifunction machine 1 contained in the secondary storage unit 27.

If the falsification detection application 46 determines that it has not checked all the version files 86 (that is, there remains one or more version files 86 that have not been checked) (NO in step 355), in step S56, the falsification detection application 46 extracts one of the version files 86 from the secondary storage unit 27. In step S57, the falsification detection application 46 extracts a version character string from the extracted one of the version files 86.

In step S58, the falsification detection application 46 extracts the version character string of a corresponding firmware item from the version output file obtained in step S54. In step S59, the falsification detection application 46 compares the version character string extracted in step S57 and the version character string extracted in step S58, and determines whether they match.

The process of step S59 determines whether there is a match between the current version character string of the firmware 82 installed in the multifunction machine 1 and the version character string of the firmware 82 at the time of its installation in the multifunction machine 1.

If the version character strings match in step S59 (YES in step S59), the falsification detection application 46 returns to step S55. If the version character strings do not match in step S59 (NO in step S59), the falsification detection application 46 determines that the firmware 82 has been falsified and proceeds to step S60, where the falsification detection application 46 outputs a screen as shown in FIG. 13 to the operations panel of the multifunction machine 1 and stops the multifunction machine 1.

Figure 13:
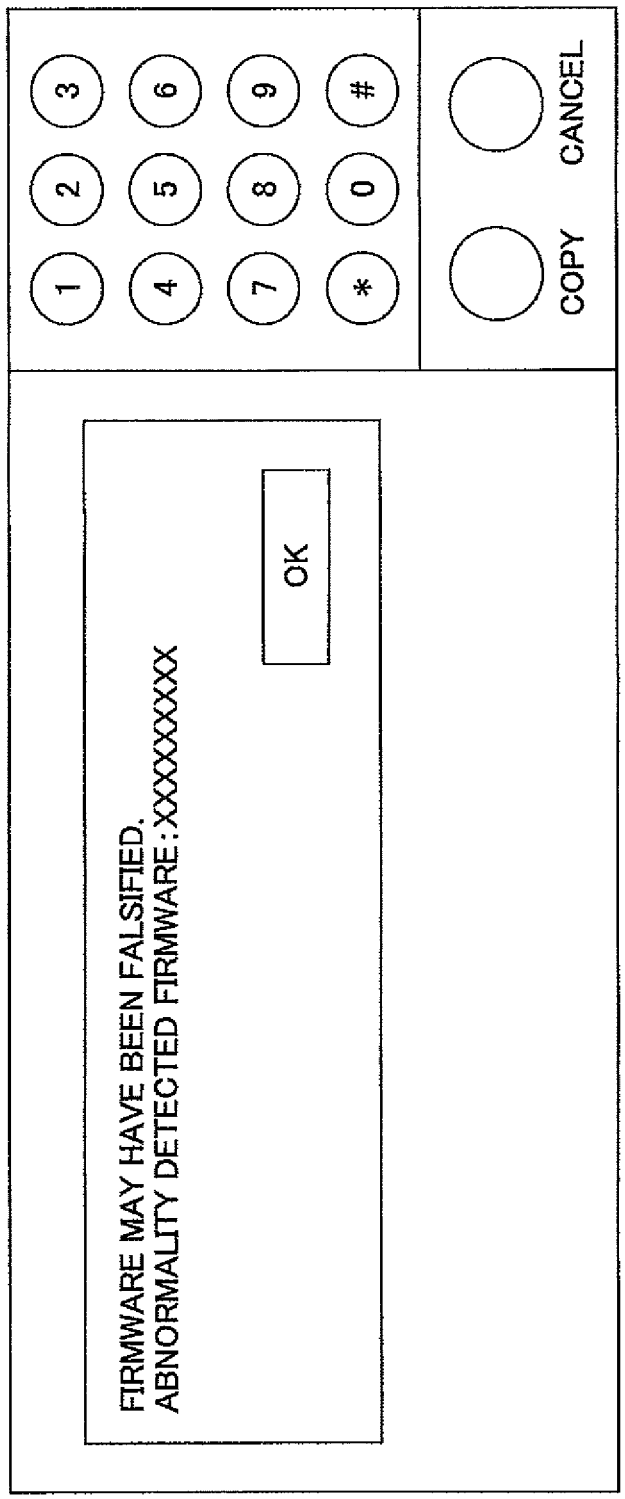
FIG. 13 is a diagram showing a screen displayed on an operations panel in response to detection of falsification according to the embodiment of the present invention.

FIG. 13 is a diagram showing a screen displayed on the operations panel in response to detection of falsification. The screen of FIG. 13 includes comments for notifying an operator of detection of abnormality and information on a firmware item of which abnormality has been detected.

Further, if the falsification detection application 46 determines in step S55 that it has checked all the version files 86 (that is, there remains no version file 86 that has not been checked) (YES in step S55), in step S61, the falsification detection application 46 determines whether there remains one or more version character strings that have not been checked in the version output file.

Figure 14:
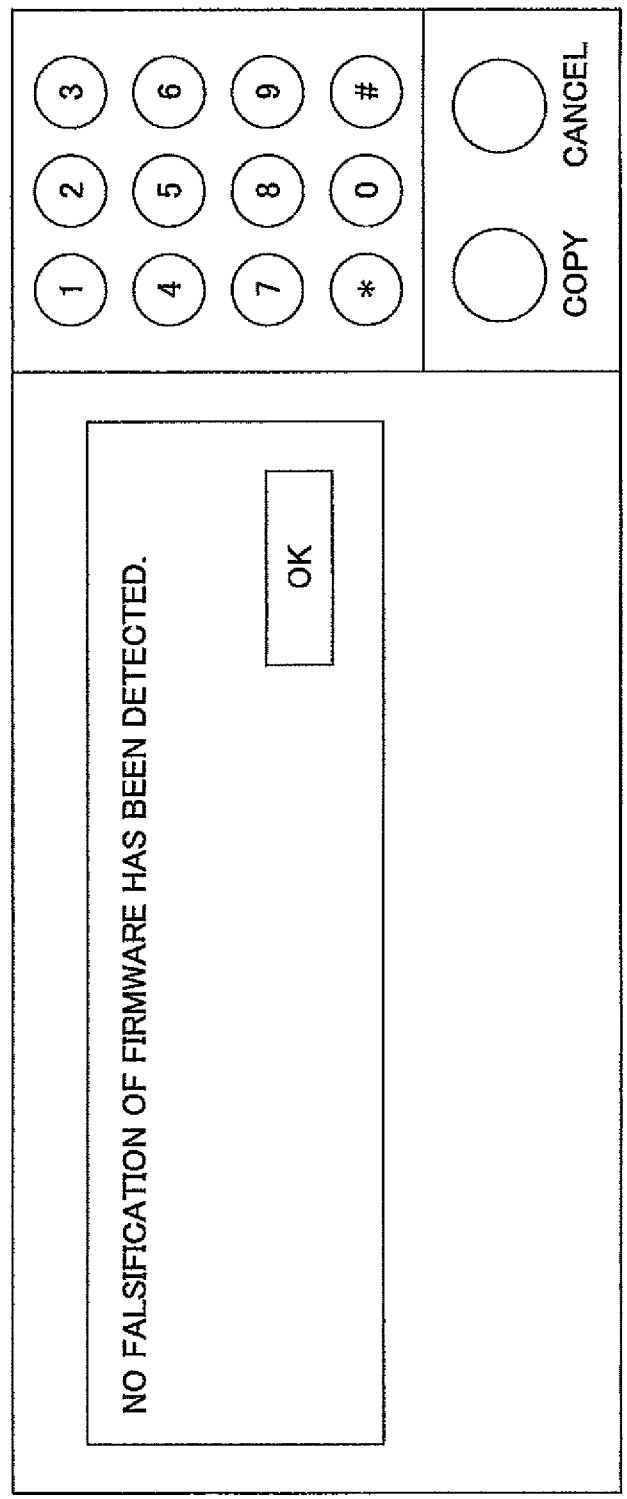
FIG. 14 is a diagram showing a screen displayed on the operations panel in response to detection of no falsification according to the embodiment of the present invention.

If there remains no version character string that has not been checked in the version output file (YES in step S61), in step S62, the falsification detection application 46 outputs a screen as shown in FIG. 14 to the operations panel and continues starting up (booting) the multifunction machine 1.

FIG. 14 is a diagram showing a screen displayed on the operations panel in response to detection of no falsification. The screen of FIG. 14 includes comments for notifying an operator of detection of no abnormality.

Figure 15:
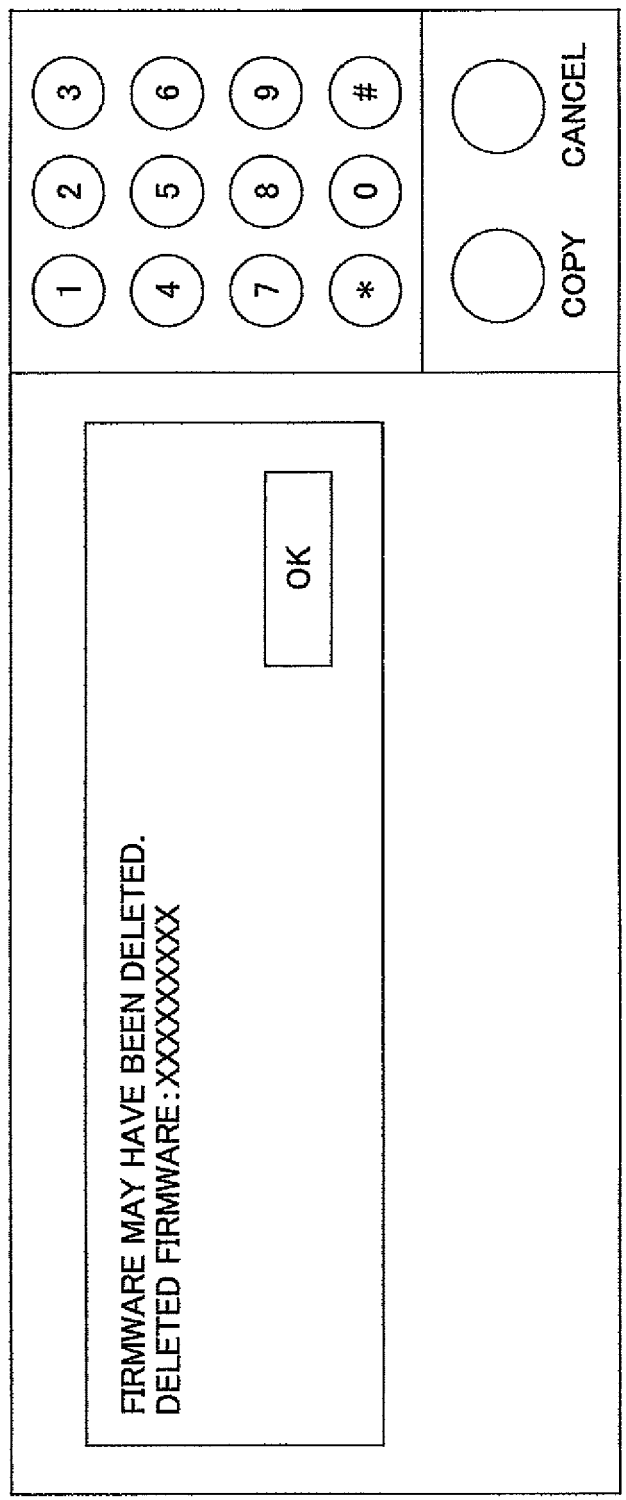
FIG. 15 is a diagram showing a screen displayed on the operations panel in response to detection of falsification according to the embodiment of the present invention.

On the other hand, if there remains a version character string that has not been checked in the version output file (NO in step S61), in step S63, the falsification detection application 46 outputs a screen as shown in FIG. 15 to the operations panel and stops the multifunction machine 1. The multifunction machine 1 is stopped in step S63 because it is highly likely that a firmware item has been deleted from the multifunction machine 1 (the firmware configuration of the multifunction machine 1 has been falsified) if there remains a version character string that has not been checked in the version output file.

FIG. 15 is a diagram showing a screen displayed on the operations panel in response to detection of falsification. The screen of FIG. 15 includes comments for notifying an operator of detection of abnormality (deletion of firmware) and information on deleted firmware.

Thus, according to the multifunction machine 1 of the first configuration, it is possible to easily detect falsification of installed firmware and falsification of firmware configuration.

[Second Configuration]

According to a second configuration of this embodiment, the multifunction machine 1 executes detection of falsification of installed firmware based on an instruction from an operator. Further, a file configuration list representing the file configuration of the secondary storage unit 27 of the multifunction machine 1 after installation of its firmware, such as the result of execution of ls of UNIX (registered trademark), constitutes firmware configuration information. Further, the external secondary storage unit is an external server.

Figure 16:
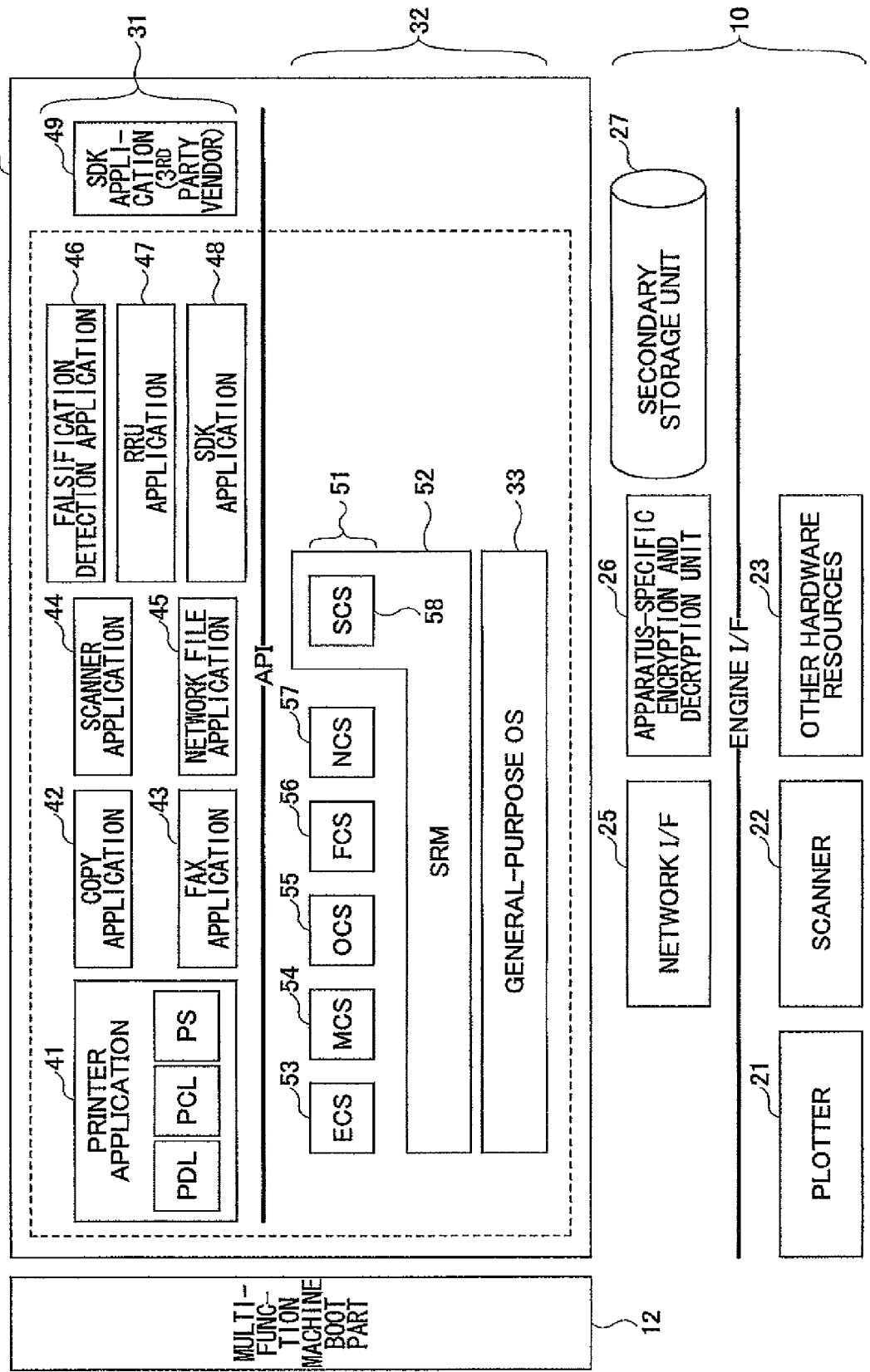
FIG. 16 is a block diagram showing the multifunction machine according to a second configuration of the embodiment of the present invention.

FIG. 16 is a block diagram showing the multifunction machine 1 according to the second configuration. The multifunction machine 1 of FIG. 16 does not have the external secondary storage unit I/F 24, which is a difference from the configuration of FIG. 1.

Figure 17:
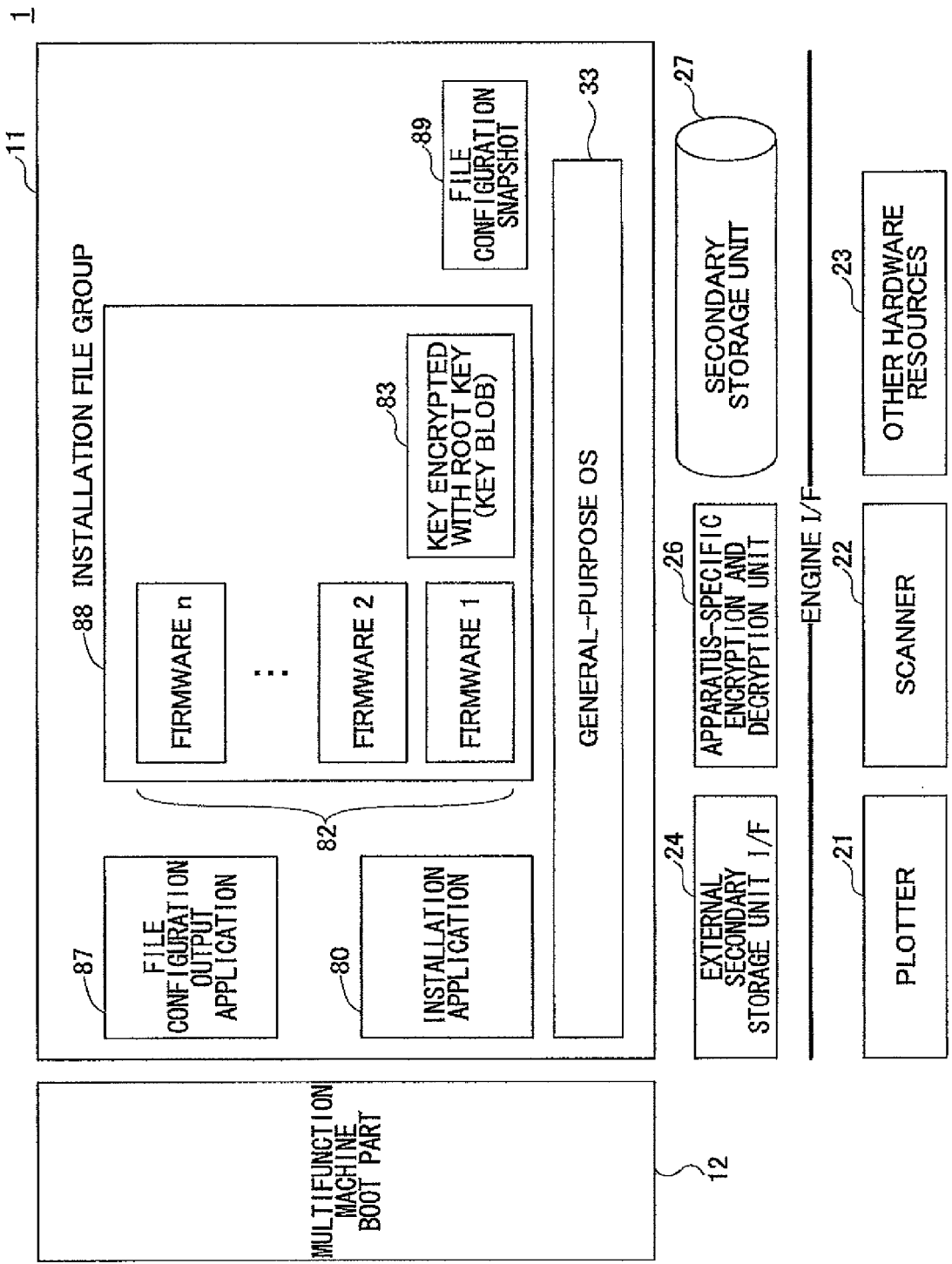
FIG. 17 is a block diagram for illustrating the writing of firmware into the multifunction machine according to the second configuration of the embodiment of the present invention.

FIG. 17 is a block diagram for illustrating the writing of firmware into the multifunction machine 1 of the second configuration. The block diagram of FIG. 17 is different from the block diagram of FIG. 5 in that a file configuration snapshot 89 representing the file configuration of the secondary storage unit 27 is used in place of the firmware configuration information 84 of FIG. 5.

The file configuration snapshot 89 is generated by, for example, execution of ls of UNIX (registered trademark) by a file configuration output application 87. The file configuration snapshot 89 is a file configuration list that represents the file configuration of the secondary storage unit 27 of the multifunction machine 1 after installation of its firmware.

Figure 18:
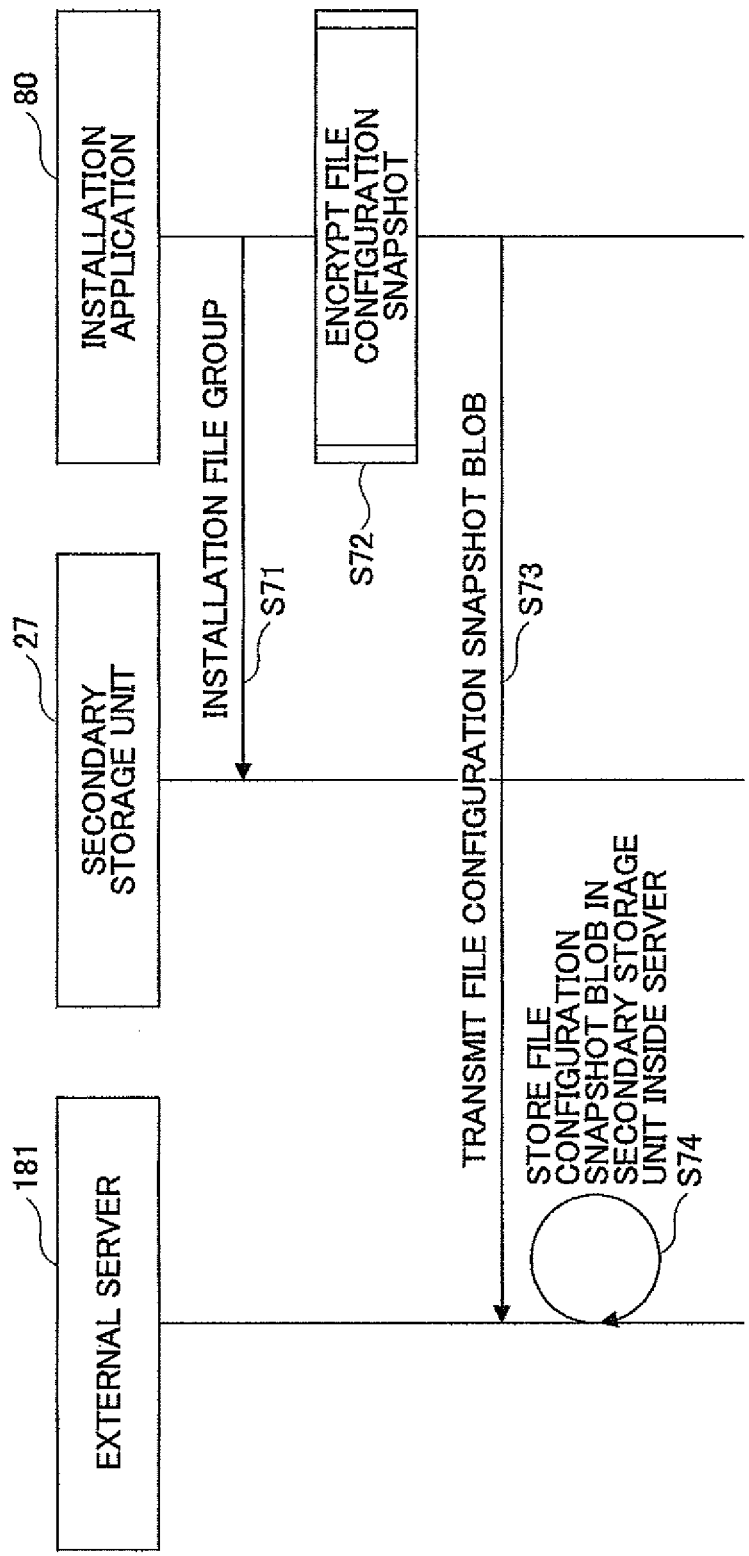
FIG. 18 is a sequence diagram for illustrating the writing of firmware into the multifunction machine according to the second configuration of the embodiment of the present invention.

FIG. 18 is a sequence diagram for illustrating the writing of firmware into the multifunction machine 1 of the second configuration. In step S71, the installation application 80 writes an installation file group 88 in the secondary storage unit 27 of the multifunction machine 1. In step 372, the installation application 80 encrypts the file configuration snapshot 89 as illustrated in FIG. 19.

Figure 19:
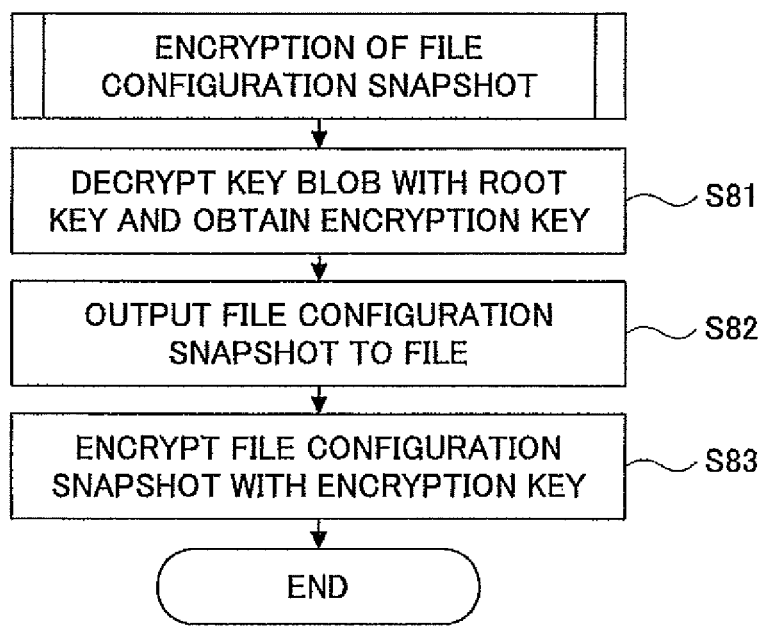
FIG. 19 is a flowchart illustrating a file configuration snapshot encryption process according to the second configuration of the embodiment of the present invention.

FIG. 19 is a flowchart illustrating a file configuration snapshot encryption process. In step S81, the installation application 80 transmits the key BLOB 83 included in the installation file group 88 to the apparatus-specific encryption and decryption unit 26, and causes the apparatus-specific encryption and decryption unit 26 to decrypt the key BLOB 83 with the root key 61, thereby obtaining an encryption key. In step S82, the installation application 80 outputs the file configuration snapshot 89 to a file.

In step S83, the installation application 80 encrypts the file to which the file configuration snapshot has been output with the encryption key, thereby generating a file configuration snapshot BLOB.

Then, proceeding to step S73 of FIG. 18, the installation application 80 transmits the file configuration snapshot BLOB to an external server 181 connected via the network I/F 25. In step S74, the external server 181 stores the file configuration snapshot BLOB in, for example, a secondary storage unit inside the external server 181.

According to the multifunction machine 1 of the second configuration, it is possible to prevent falsification by a malicious third party by storing the file configuration snapshot BLOB in the secondary storage unit inside the external server 181 outside the multifunction machine 1.

Figure 20:
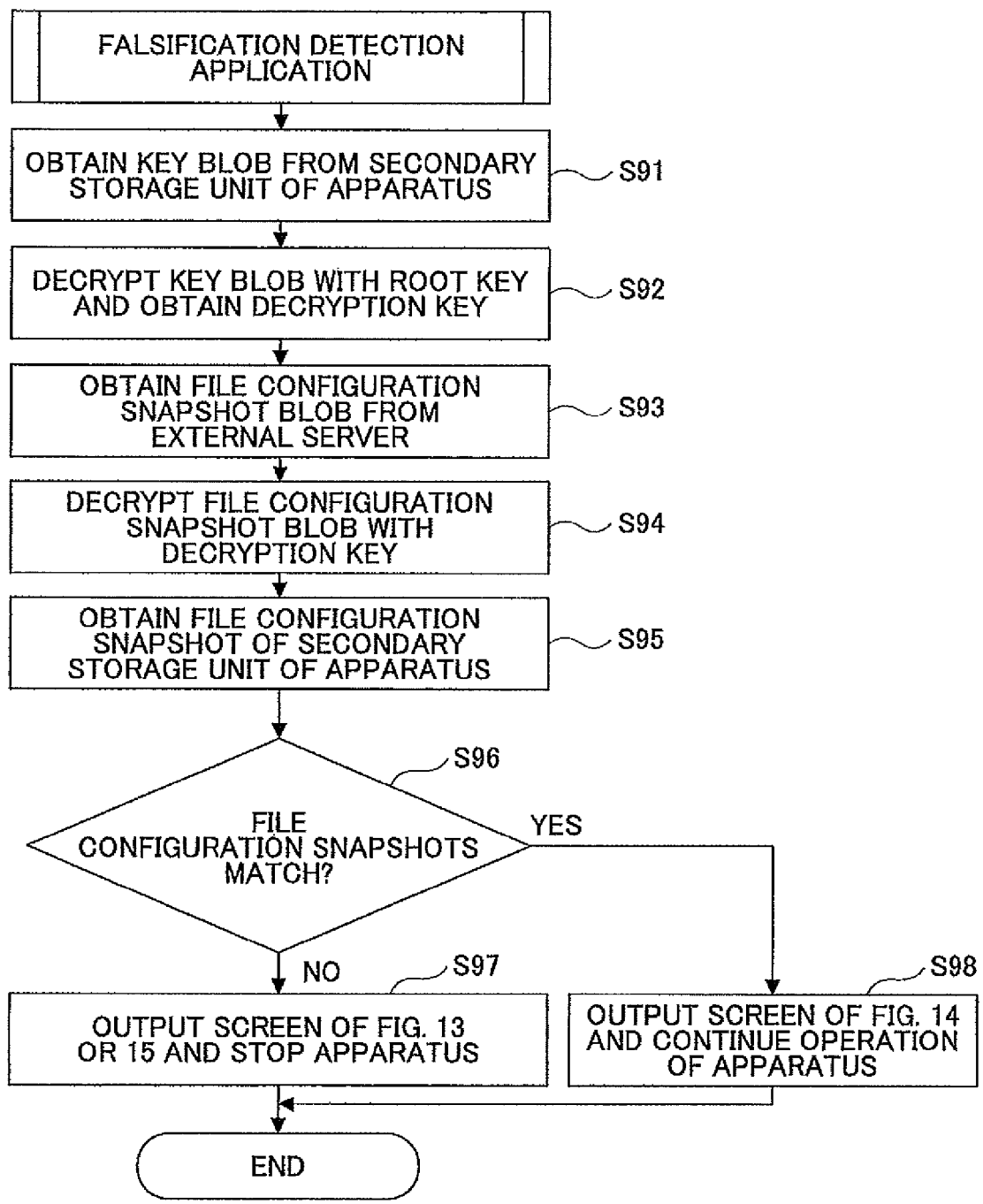
FIG. 20 is a flowchart for illustrating detection of firmware falsification in the multifunction machine according to the second configuration of the embodiment of the present invention.

FIG. 20 is a flowchart for illustrating detection of firmware falsification in the multifunction machine 1 of the second configuration. The configuration of the multifunction machine 1 at the time of executing firmware falsification detection is equivalent to that of FIG. 16.

Referring to FIG. 20, in step S91, the falsification detection application 46 extracts the key BLOB 83 from the secondary storage unit 27 of the multifunction machine 1. In step S92, the falsification detection application 46 transmits the key BLOB 83 to the apparatus-specific encryption and decryption unit 26, and causes the apparatus-specific encryption and decryption unit 26 to decrypt the key BLOB 83 with the root key 61, thereby obtaining a decryption key. In step S93, the falsification detection application 46 extracts the file configuration snapshot BLOB from the external server 181 connected via the network I/F 25. In step S94, the falsification detection application 46 decrypts the file configuration snapshot BLOB with the decryption key, thereby obtaining the file configuration snapshot 89.

In step S95, the falsification detection application 46 obtains a file configuration snapshot that is a file configuration list representing the current file configuration of the secondary storage unit 27 of the multifunction machine 1.

In step S96, the falsification detection application 46 compares the file configuration snapshot 89 obtained in step S94 and the file configuration snapshot obtained in step S95, and determines whether they match. The process of step S96 determines whether there is a match between the current file configuration snapshot of the multifunction machine 1 and the file configuration snapshot 89 of the multifunction machine 1 after installation of its firmware.

If the file configuration snapshots do not match in step S96 (NO in step S96), in step S97, the falsification detection application 46 outputs a screen as shown in FIG. 13 or FIG. 15 to the operations panel and stops the multifunction machine 1.

If the file configuration snapshots match in step S96 (YES in step S96), in step S98, the falsification detection application 46 outputs a screen as shown in FIG. 14 to the operations panel and continues the operation of the multifunction machine 1.

Thus, according to the multifunction machine 1 of the second configuration, it is possible to easily detect falsification of installed firmware and falsification of firmware configuration.

According to one embodiment of the present invention, a method of detecting a falsification of software installed in an apparatus is provided that includes the steps of (a) encrypting software configuration information of the apparatus at a time of installing the software using an encryption and decryption unit specific to the apparatus, and storing the encrypted software configuration information outside the apparatus, (b) decrypting the encrypted software configuration information of the apparatus at the time of installing the software, stored outside the apparatus, using the encryption and decryption unit specific to the apparatus, and (c) determining a presence or absence of the falsification of the software by comparing the software configuration information of the apparatus at the time of installing the software obtained by said step (b) and current software configuration information of the apparatus.

Additionally, in the above-described method, the software configuration information of the apparatus at the time of installing the software may be included in a group of files for installation.

Additionally, in the above-described method, the software configuration information of the apparatus at the time of installing the software may be generated by a command to obtain a file configuration, after installing the software using a group of files for installation.

Additionally, in the above-described method, step (a) may store the software configuration information of the apparatus at the time of installing the software in a portable recording medium.

Additionally, in the above-described method, step (a) may store the software configuration information of the apparatus at the time of installing the software in an external server connected to the apparatus via a network.

Additionally, in the above-described method, step (c) may determine the presence or absence of the falsification of the software at a startup time of the apparatus or based on an instruction from an operator of the apparatus.

Thus, according to one aspect of the present invention, it is possible to provide a method of detecting software falsification and an apparatus configured to detect software falsification that can easily detect falsification of installed software and falsification of software configuration, and a computer-readable storage medium storing a program for causing a computer to execute such a method.

The present invention is not limited to the specifically disclosed embodiment, and variations and modifications may be made without departing from the scope of the present invention.

In FIG. 1, FIG. 8, and FIG. 16, the firmware enclosed by a broken line is subjected to falsification detection. Further, the current firmware configuration information of the multifunction machine 1 may be that stored in the secondary storage unit 27 at the time of installation or may be generated every time firmware falsification detection is performed.

In the case of using the firmware configuration information stored in the secondary storage unit 27 at the time of installation as the current firmware configuration information, the firmware configuration information stored in the secondary storage unit 27 is updated every time the firmware is updated. Further, in the case of firmware updating, the multifunction machine 1 of this embodiment may perform the same processing as that at the time of firmware installation.

Methods, apparatuses, systems, computer programs, recording media, and data structures to which one or more constituent elements or representations of the present invention or any combination of constituent elements of the present invention is applied are also valid as forms of the present invention.

The present application is based on Japanese Laid-Open Patent Application No. 2008-036267, filed on Feb. 18, 2008, the entire contents of which are incorporated herein by reference.

What is claimed is:

1. A method of detecting a falsification of software installed in an apparatus, the method comprising the steps of:
    (a) encrypting software configuration information of the apparatus using an encryption and decryption unit specific to the apparatus, and storing the encrypted software configuration information in an external storage, at a time of installation of the software;
    (b) decrypting the encrypted software configuration information of the apparatus stored in the external storage, using the encryption and decryption unit specific to the apparatus, at a time later than the time of the installation of the software; and
    (c) determining a presence or absence of the falsification of the software by comparing the software configuration information of the apparatus stored at the time of the installation of the software obtained by said step (b) and current software configuration information of the apparatus.

2. The method as claimed in claim 1, wherein said step (a) comprises:
    (d) decrypting an encrypted encryption key with the encryption and decryption unit specific to the apparatus;
    (e) encrypting the software configuration information of the apparatus with the encryption key decrypted in said step (d); and
    (f) storing the software configuration information of the apparatus encrypted in said step (e) in the external storage.

3. The method as claimed in claim 1, wherein said step (b) comprises:
    (d) obtaining the software configuration information of the apparatus encrypted and stored at the time of the installation of the software in said step (a) from the external storage;
    (e) decrypting an encrypted decryption key with the encryption and decryption unit specific to the apparatus; and
    (f) decrypting the encrypted software configuration information of the apparatus with the decryption key decrypted in said step (e).

4. The method as claimed in claim 1, wherein said step (c) compares the software configuration information of the apparatus stored at the time of the installation of the software obtained by said step (b) and the current software configuration information of the apparatus, and detects the falsification of the software in response to a mismatch therebetween.

5. The method as claimed in claim 1, wherein the encryption and decryption unit specific to the apparatus comprises:
- an encryption/decryption key non-extractable from inside the encryption and decryption unit specific to the apparatus;
- a first interface configured to encrypt a plaintext with the encryption/decryption key and return the encrypted plaintext; and
- a second interface configured to decrypt encrypted data with the encryption/decryption key and return the data.

6. A non-transitory computer-readable storage medium storing a program for causing a computer to execute a method of detecting a falsification of software installed in an apparatus, the method comprising the steps of:
- (a) encrypting software configuration information of the apparatus using an encryption and decryption unit specific to the apparatus, and storing the encrypted software configuration information in an external storage, at a time of installation of the software;
- (b) decrypting the encrypted software configuration information of the apparatus stored in the external storage, using the encryption and decryption unit specific to the apparatus, at a time later than the time of the installation of the software; and
- (c) determining a presence or absence of the falsification of the software by comparing the software configuration information of the apparatus stored at the time of the installation of the software obtained by said step (b) and current software configuration information of the apparatus.

7. The non-transitory computer-readable storage medium as claimed in claim 6, wherein said step (a) comprises:
- (d) decrypting an encrypted encryption key with the encryption and decryption unit specific to the apparatus;
- (e) encrypting the software configuration information of the apparatus with the encryption key decrypted in said step (d); and
- (f) storing the software configuration information of the apparatus encrypted in said step (e) in the external storage.

8. The non-transitory computer-readable storage medium as claimed in claim 6, wherein said step (b) comprises:
- (d) obtaining the software configuration information of the apparatus encrypted and stored at the time of the installation of the software in said step (a) from the external storage;
- (e) decrypting an encrypted decryption key with the encryption and decryption unit specific to the apparatus; and
- (f) decrypting the encrypted software configuration information of the apparatus with the decryption key decrypted in said step (e).

9. The non-transitory computer-readable storage medium as claimed in claim 6, wherein said step (c) compares the software configuration information of the apparatus stored at the time of the installation of the software obtained by said step (b) and the current software configuration information of the apparatus, and detects the falsification of the software in response to a mismatch therebetween.

10. The non-transitory computer-readable storage medium as claimed in claim 6, wherein the encryption and decryption unit specific to the apparatus comprises:
- an encryption/decryption key non-extractable from inside the encryption and decryption unit specific to the apparatus;
- a first interface configured to encrypt a plaintext with the encryption/decryption key and return the encrypted plaintext; and
- a second interface configured to decrypt encrypted data with the encryption/decryption key and return the data.

11. An apparatus configured to detect a falsification of software installed therein, the apparatus comprising:
- an encryption and decryption unit specific to the apparatus;
- an installation part configured to install the software; and
- a falsification detection part configured to detect the falsification of the software,
- wherein the installation part is configured to encrypt software configuration information of the apparatus using the encryption and decryption unit specific to the apparatus, and to store the encrypted software configuration information in an external storage, at a time of installation of the software, and
- the falsification detection part is configured to decrypt the encrypted software configuration information of the apparatus stored in the external storage, using the encryption and decryption unit specific to the apparatus, at a time later than the time of the installation of the software, and to determine a presence or absence of the falsification of the software by comparing the software configuration information of the apparatus stored at the time of the installation of the software, obtained by said decryption, and current software configuration information of the apparatus.

12. The apparatus as claimed in claim 11, wherein the installation part is configured to decrypt an encrypted encryption key with the encryption and decryption unit specific to the apparatus, to encrypt the software configuration information of the apparatus with the decrypted encryption key, and to store the encrypted software configuration information of the apparatus in the external storage.

13. The apparatus as claimed in claim 11, wherein the falsification detection part is configured to obtain the encrypted software configuration information of the apparatus stored at the time of the installation of the software from the external storage, to decrypt an encrypted decryption key with the encryption and decryption unit specific to the apparatus, and to decrypt the encrypted software configuration information of the apparatus with the decrypted decryption key.

14. The apparatus as claimed in claim 11, wherein the falsification detection part is configured to compare the software configuration information of the apparatus stored at the time of the installation of the software and the current software configuration information of the apparatus, and to detect the falsification of the software in response to a mismatch therebetween.

15. The apparatus as claimed in claim 11, wherein the encryption and decryption unit specific to the apparatus comprises:
- an encryption/decryption key non-extractable from inside the encryption and decryption unit specific to the apparatus;
- a first interface configured to encrypt a plaintext with the encryption/decryption key and return the encrypted plaintext; and
- a second interface configured to decrypt encrypted data with the encryption/decryption key and return the data.

16. The apparatus as claimed in claim 11, wherein the software configuration information of the apparatus stored at the time of the installation of the software is included in a group of files for installation.

17. The apparatus as claimed in claim 11, wherein the software configuration information of the apparatus stored at the time of the installation of the software is generated by a command to obtain a file configuration, after the installation of the software using a group of files for the installation.

18. The apparatus as claimed in claim 11, wherein the installation part is configured to store the software configuration information of the apparatus in a portable recording medium at the time of the installation of the software.

19. The apparatus as claimed in claim 11, wherein the installation part is configured to store the software configuration information of the apparatus in the external storage in an external server connected to the apparatus via a network at the time of the installation of the software.

20. The apparatus as claimed in claim 11, wherein the falsification detection part is configured to determine the presence or absence of the falsification of the software at a startup time of the apparatus or based on an instruction from an operator of the apparatus.

* * * * *